(12) United States Patent
Torrens Rasal

(10) Patent No.: US 8,726,898 B2
(45) Date of Patent: May 20, 2014

(54) SOLAR THERMAL COLLECTOR

(76) Inventor: Jose Maria Torrens Rasal, Barcelona (ES)

( * ) Notice: Subject to any disclaimer, the term of this patent is extended or adjusted under 35 U.S.C. 154(b) by 988 days.

(21) Appl. No.: 12/821,327

(22) Filed: Jun. 23, 2010

(65) Prior Publication Data

US 2011/0315137 A1  Dec. 29, 2011

(51) Int. Cl.
*F24J 2/40* (2006.01)

(52) U.S. Cl.
USPC ........... 126/589; 126/595; 126/588; 126/598; 126/599; 165/48.2

(58) Field of Classification Search
USPC ......... 126/591, 595, 599, 611, 655, 579, 643, 126/651, 589, 598, 588; 165/48.2
See application file for complete search history.

(56) References Cited

U.S. PATENT DOCUMENTS

| | | | | |
|---|---|---|---|---|
| 1,918,682 A | * | 7/1933 | Altenkirch | 165/48.2 |
| 2,396,338 A | * | 3/1946 | Newton | 126/589 |
| 2,722,404 A | * | 11/1955 | Koff | 165/123 |
| 3,749,158 A | * | 7/1973 | Szabo et al. | 165/96 |
| 3,965,972 A | * | 6/1976 | Petersen | 126/640 |
| 3,991,938 A | * | 11/1976 | Ramey | 126/646 |
| 4,004,573 A | * | 1/1977 | Frieling et al. | 165/48.2 |
| 4,050,508 A | * | 9/1977 | Buckley | 126/638 |
| 4,051,999 A | * | 10/1977 | Granger et al. | 126/591 |
| 4,083,490 A | * | 4/1978 | Cunningham et al. | 126/591 |
| 4,111,185 A | * | 9/1978 | Swann | 126/629 |
| 4,127,103 A | * | 11/1978 | Klank et al. | 126/643 |
| 4,209,007 A | * | 6/1980 | Collins | 126/585 |
| 4,232,656 A | * | 11/1980 | Teagan | 126/588 |
| 4,279,244 A | * | 7/1981 | McAlister | 126/698 |
| 4,314,547 A | * | 2/1982 | Walsh | 126/629 |
| 4,473,063 A | | 9/1984 | Mackensen | |
| 4,531,510 A | * | 7/1985 | Barthez et al. | 126/585 |
| 4,622,951 A | * | 11/1986 | Matzkanin | 126/640 |

\* cited by examiner

*Primary Examiner* — John K Fristoe, Jr.
*Assistant Examiner* — Craig J Price
(74) *Attorney, Agent, or Firm* — Zilka-Kotab, PC

(57) ABSTRACT

Solar thermal collector comprising a plurality of parallel vertical tubes, connected to each other by one upper horizontal tube and one lower horizontal tube through which a heat carrying fluid flows, a glass surface that covers the parallel vertical tubes, the upper horizontal tube and the lower horizontal tube, and a dissipating device installed in an upper part of the solar thermal collector, the heat dissipating device comprising a thermostatic valve, a heat exchanger and a return pipe, wherein the thermostatic valve is housed in the upper horizontal tube, the thermostatic valve and the heat exchanger being connected to a pipe by way of an inverted U-shaped tube provided at a greater height than the inlet to the heat exchanger, such that, under normal working conditions, energy losses by heat transfer by convection from the thermostatic valve to the heat exchanger are interrupted.

11 Claims, 6 Drawing Sheets

SOLAR THERMAL COLLECTOR

OBJECT OF THE INVENTION

Figure 1:
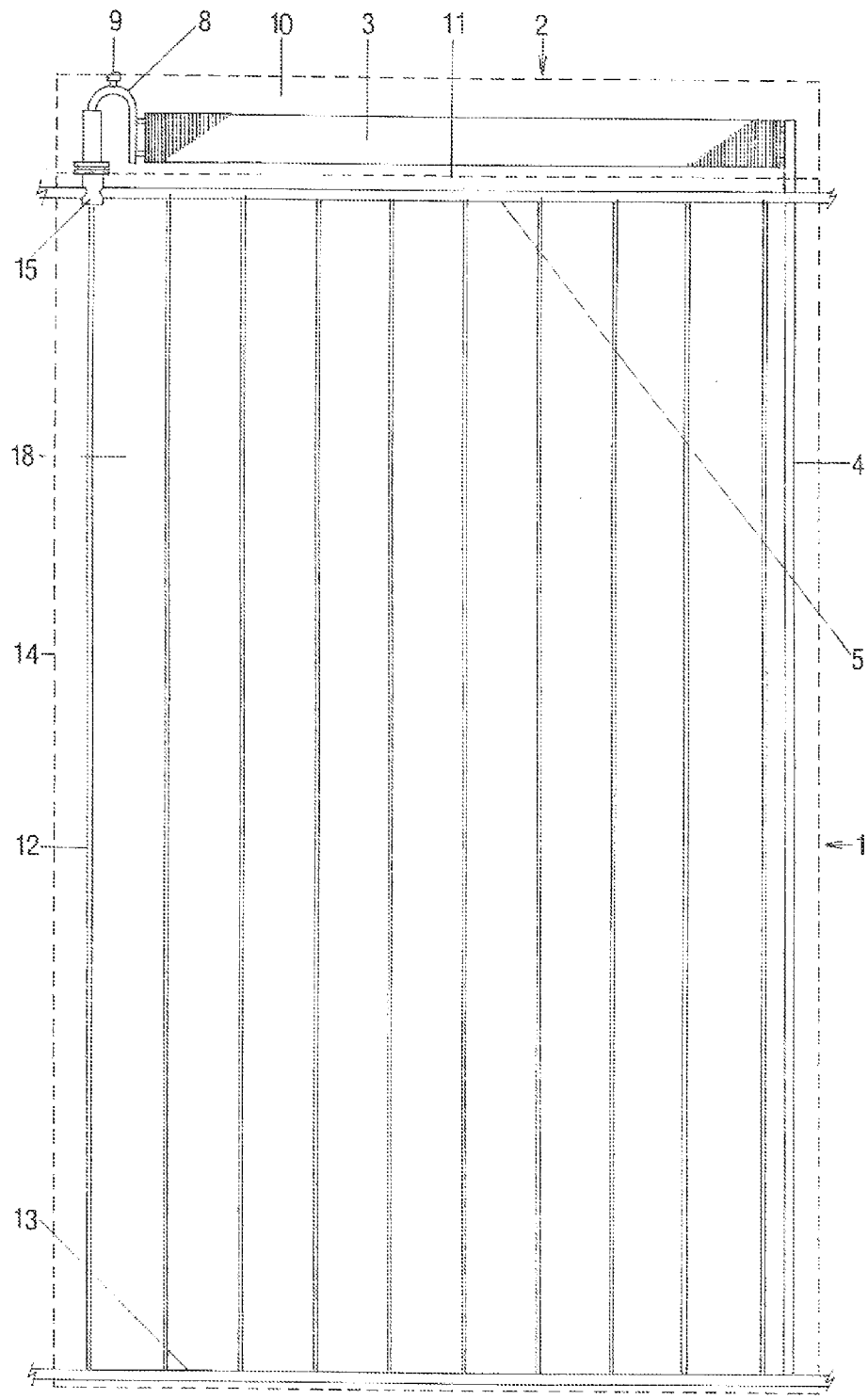

The present invention is related to a solar thermal collector that incorporates considerable innovations and advantages compared to the existing models.

More specifically, the invention refers to a solar thermal collector that allows the maximum temperature to be self limited by means of a completely autonomous system, which prevents overheating in a reliable manner without electrical components.

BACKGROUND TO THE INVENTION

The solar thermal collectors that allow the energy coming from the sun to be taken advantage of for the purpose of saving energy are widely known. However, these conventional solar collectors reach high stagnation temperatures, around 200° C. in flat plate collectors and 300° C. in evacuated tubes. These temperatures generate overheating in the solar energy installation, bringing about a series of unwanted consequences such as corrosion, scaling, electrical pump cavitations, loss of anti-freeze, degrading of the heat carrying liquid, degrading of the selective surfaces of the collectors and material stress. The end result is that the solar energy installation stops working due to said overheating.

In order to prevent this problem it is a common practice to install manual or automatic heat dissipating systems. However, these systems are not reliable because they depend on human action (covering the collectors with canopies, blankets, plates, etc.) and electrical mechanisms (servo-motors, electro-valves, electro motor pumps and fans, etc.), hence being sufficient a momentary stop of the electrical supply and/or a failure of one of these mechanisms, to provoke the overheating and the resulting harm to the solar power installation. As can be supposed, there is the subsequent need to replace all those damaged parts, with the financial costs that this brings about.

Another disadvantage of these dissipating systems lies in the fact that the thermostatic valves that regulate the inlet of heat carrying fluid into the dissipating system are outside of the solar thermal collector and therefore cannot take into account the temperature that the fluid on the inside of the solar thermal collector reaches; consequently the sensing element in the valve is not activated until the solar thermal collector has reached a temperature that is too high.

In general these systems return the heat carrying fluid coming from the dissipating system to a lower part of the hot water installation by means of gravity. This requires the use of more piping that increases the complexity and consequently the cost of the assembly.

In addition, to provide the solar energy installation of solar thermal collectors with dissipating systems, it requires qualified people to take part so as to study the arrangement of the differing components of the solar energy installation in order to obtain optimum results. This means additional costs in labour, materials and transport, with the additional risk that the assembly is not carried out correctly. The final result increases the visual impact by adding more piping and dissipaters to the original installation.

Document U.S. Pat. No. 4,473,063 describes a solar thermal collector provided with a dissipating system to prevent overheating that has an effect on the above mentioned disadvantages. The dissipating system is not integral to the solar thermal collectors, but is separate, therefore its installation is more complex and costly, the visual impact is more negative and its dissipating system is exposed making it vulnerable to the elements and providing no protection against burns and injuries for installers and users. In addition, the thermostatic valve is away from the area of the solar thermal collector where the excessively high temperatures are reached, and said thermostatic valve is not activated either at the right moment or reliably with the needs of a true temperature safety limitation.

DESCRIPTION OF THE INVENTION

The present invention has been developed for the purpose of providing a solar thermal collector that solves the above-mentioned disadvantages, in addition contributing other additional advantages that will become clear from the description that is given below.

In this document the upper horizontal tube and the lower horizontal tube shall be understood as being in use in a solar thermal collector, and under normal working conditions it shall be understood that the pump for the solar energy installation is operating and that the temperature of the heat carrying fluid is lower than 90° C.

It is therefore, an object of the invention to provide a solar thermal collector that comprises a plurality of parallel vertical tubes, connected to each other by at least one upper horizontal tube and one lower horizontal tube, the heat carrying fluid circulating through them, a glass surface covering the parallel vertical tubes, the upper horizontal tube and the lower horizontal tube, and a dissipating device installed in an upper part of the solar thermal collector. Said dissipating device comprises a thermostatic valve, a heat exchanger and a return pipe, said thermostatic valve being advantageously housed in the upper horizontal tube.

The thermostatic valve and the heat exchanger are connected by means of a pipe by way of an inverted U-shaped tube, provided at a greater height than the inlet of said heat exchanger, in such a way that it interrupts all the transmission of heat by convection of the thermostatic valve to the heat exchanger so as to prevent heat losses in the case of normal working, i.e. this being at temperatures below a pre-set temperature of 90° C. In one embodiment of the invention, the return pipe is connected to the lower horizontal tube, in such a way that the heat carrying fluid with the maximum temperature from all of the collector is located on the inside of the thermostatic valve and from where it describes a circuit following the direction of the thermostatic valve, the heat exchanger, the return pipe, the lower horizontal tube and all of the other tubes making up the absorber so as to return once again to the thermostatic valve.

In another embodiment of the invention, the return pipe is connected to the upper horizontal tube and comprises a portion disposed at a lower height than the lower horizontal tube that is connected by way of a U-shaped tube, in such a way that it acts as a hydraulic lock to prevent small losses of heat due to the heat transfer by convection, in normal working situations, this being at temperatures below that which is pre-set.

In the embodiment of the solar thermal collector wherein the return pipe is connected to the upper horizontal tube, said solar thermal collector is advantageously provided with a lateral inclination in relation to the horizontal plane for the thermostatic valve, in such a way that the heat carrying fluid at the maximum temperature in all of the panel is stratified on the inside of the thermostatic valve and from where it describes a circuit in the direction of the thermostatic valve, the heat exchanger, the return pipe, the upper horizontal tube and all of the other tubes making up the absorber to go back again to the thermostatic valve. Said lateral inclination is at least 1 degree.

Due to these characteristics, a solar thermal collector is achieved with the dissipating device that prevents overheating without the need for there to be electrical components specially installed for this, constituting a completely autonomous system that does not require action by any operator, and which is activated starting from a pre-set temperature of the thermostatic valve at around 90° C. generated in the solar thermal collector. As there are no electrical components a reliable dissipating device is achieved, with a simple arrangement, that reduces the maintenance tasks, and consequently contributes a series of financial benefits. The complete reliability also comes from the fact of locating the thermostatic valve on the inside of the collector itself constituting a dissipating device that enables the correct working of the solar thermal collector to be guaranteed so as to take advantage of the solar energy.

The above mentioned thermostatic valve is thermally insulated at least in a partial manner and is of the four-port type. One of these ports is connected to the upper end of one of the vertical tubes of the solar thermal collector, another two ports are connected to the upper horizontal tube and the last port to the heat exchanger.

In non-working conditions of the solar energy installation, for example: Breakdown of the electrical pump, interruption in the electrical supply, holidays of the occupiers of the building, etc. the thermostatic valve installed according to this arrangement is present within a gravity circulation or thermo-U-shaped tube of the heat carrying fluid, in the direction of the upper horizontal tube, thermostatic valve, return pipe, lower horizontal tube, vertical tubes and once again the upper horizontal tube which ensures that the thermostatic valve will at all times be in the stratified area of the highest temperature of the entire surface of the solar thermal collector.

In the embodiment of the invention wherein the return pipe is connected to the upper horizontal tube, the thermostatic valve is present within a circulation of the heat carrying fluid, in the direction of the upper horizontal tube, thermostatic valve, return pipe and once again the upper horizontal tube.

Said thermostatic valve allows the flow of the heat carrying fluid to the heat exchanger when the heat carrying fluid reaches the pre-set temperature.

When the return pipe and the upper horizontal tube are connected, to prevent small energy losses under normal working conditions due to the heat transfer by conduction between both components, optionally the return pipe may have an insulating sleeve.

In addition, the solar thermal collector is provided with a manually operated air vent at the highest point.

It is intended that the dissipating device of the invention be housed in a chamber, which can be removable or not, away from the rest of the solar thermal collector by means of a dividing wall, said chamber having air grilles on at least two of the walls thereof. These characteristics prevent installation mistakes, poorly effective designs for the dissipating devices that are subsequently added to the solar energy installation, guarantee the correct workings of the dissipating device as the assembly is carried out in the workshop under homogenous conditions, and achieve a solar thermal collector without any visual impact at all.

In this way the corresponding European standards are achieved in a completely reliable and automatic way without electrical devices so as to limit the temperature of heat generators to a temperature of 105° C. and thus prevent the dangerous build up of steam in the secondary circuits of the solar energy installations.

In addition, a portion of the glass surface of the solar thermal collector is advantageously opaque, coinciding with the position of the thermostatic valve, in this way preventing the heating of said thermostatic valve by the action of solar rays, whilst the assembly is being carried out. Due to this characteristic said assembly is made easier, by allowing the handling of the thermostatic valve by the installer in complete safety as there is no risk of burns.

Other characteristics and advantages of the solar thermal collector object of this invention will become clear from the description of preferred, but not exclusive, embodiments, the drawings that are attached are by way of illustration but without being in any way limiting.

A BRIEF DESCRIPTION OF THE DRAWINGS

Figure 2:
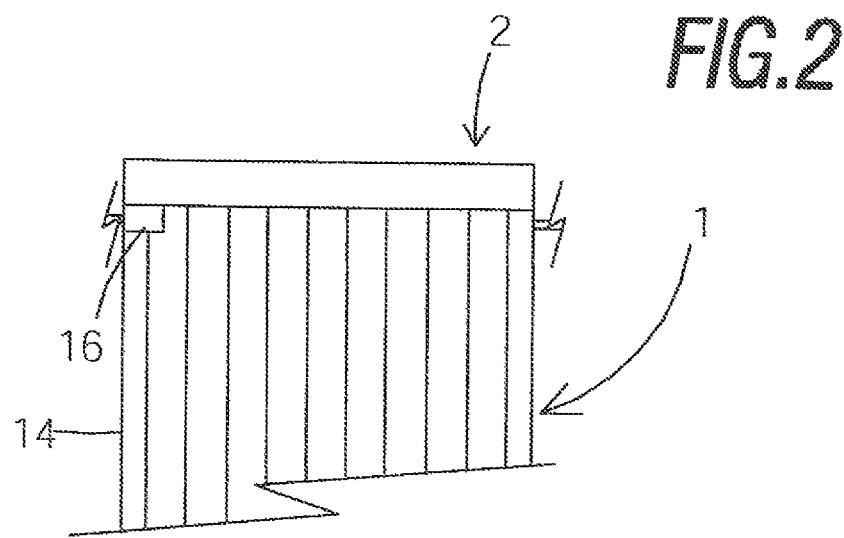
Figure 3:
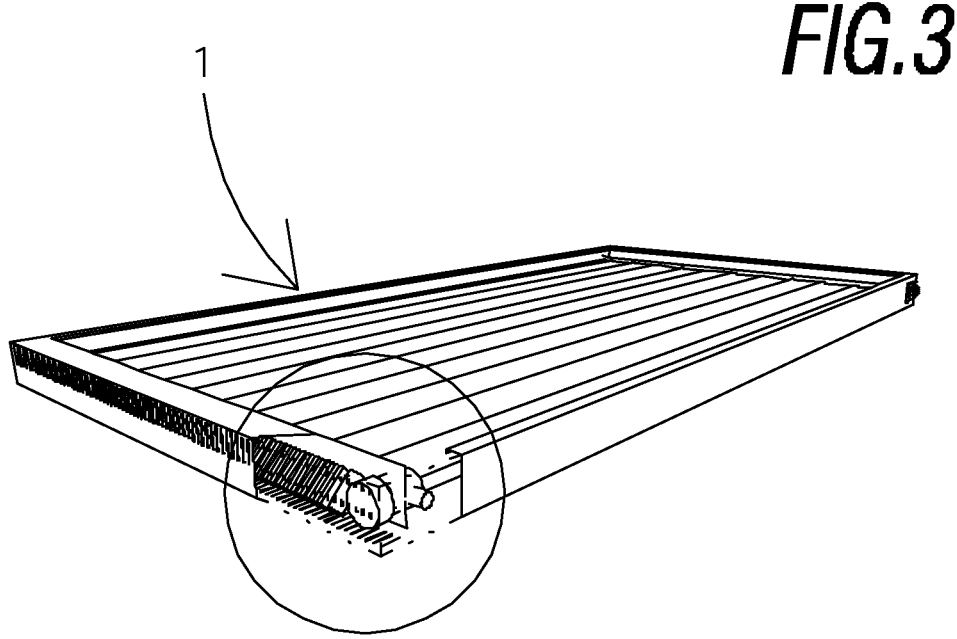
Figure 4:
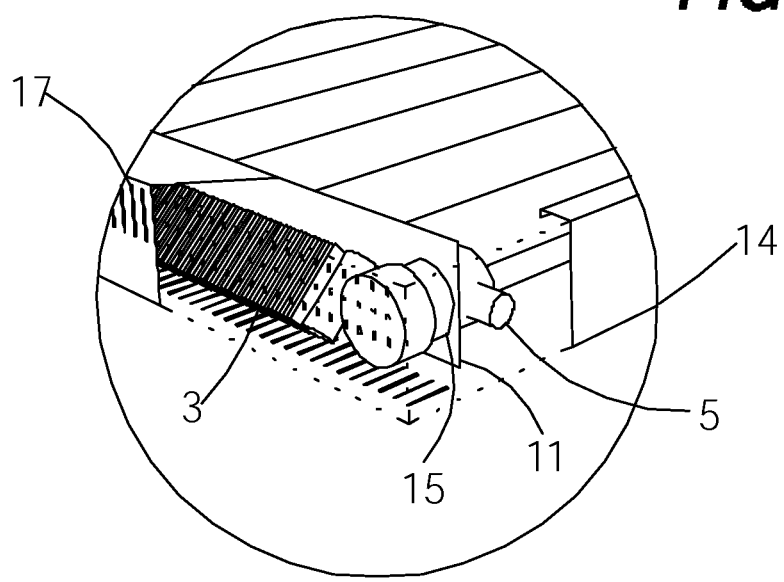
Figure 5:
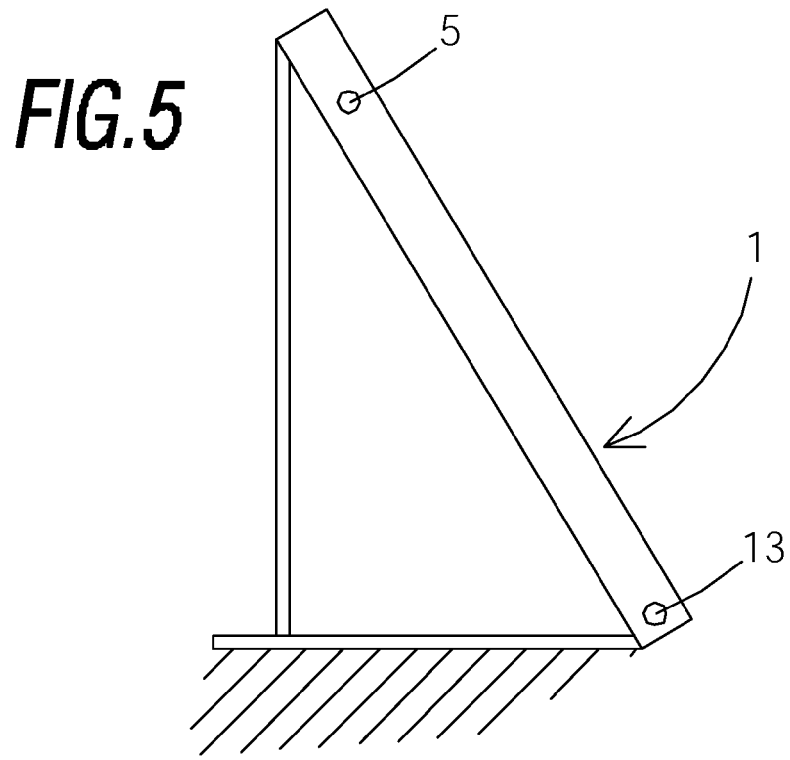
Figure 6:
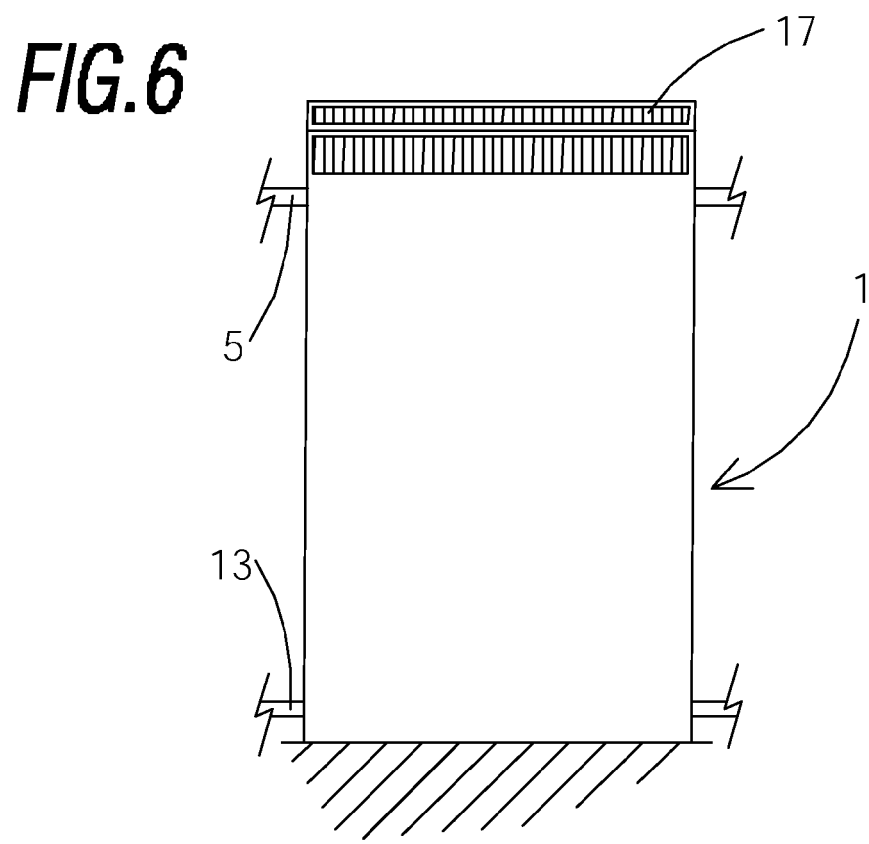
Figure 7:
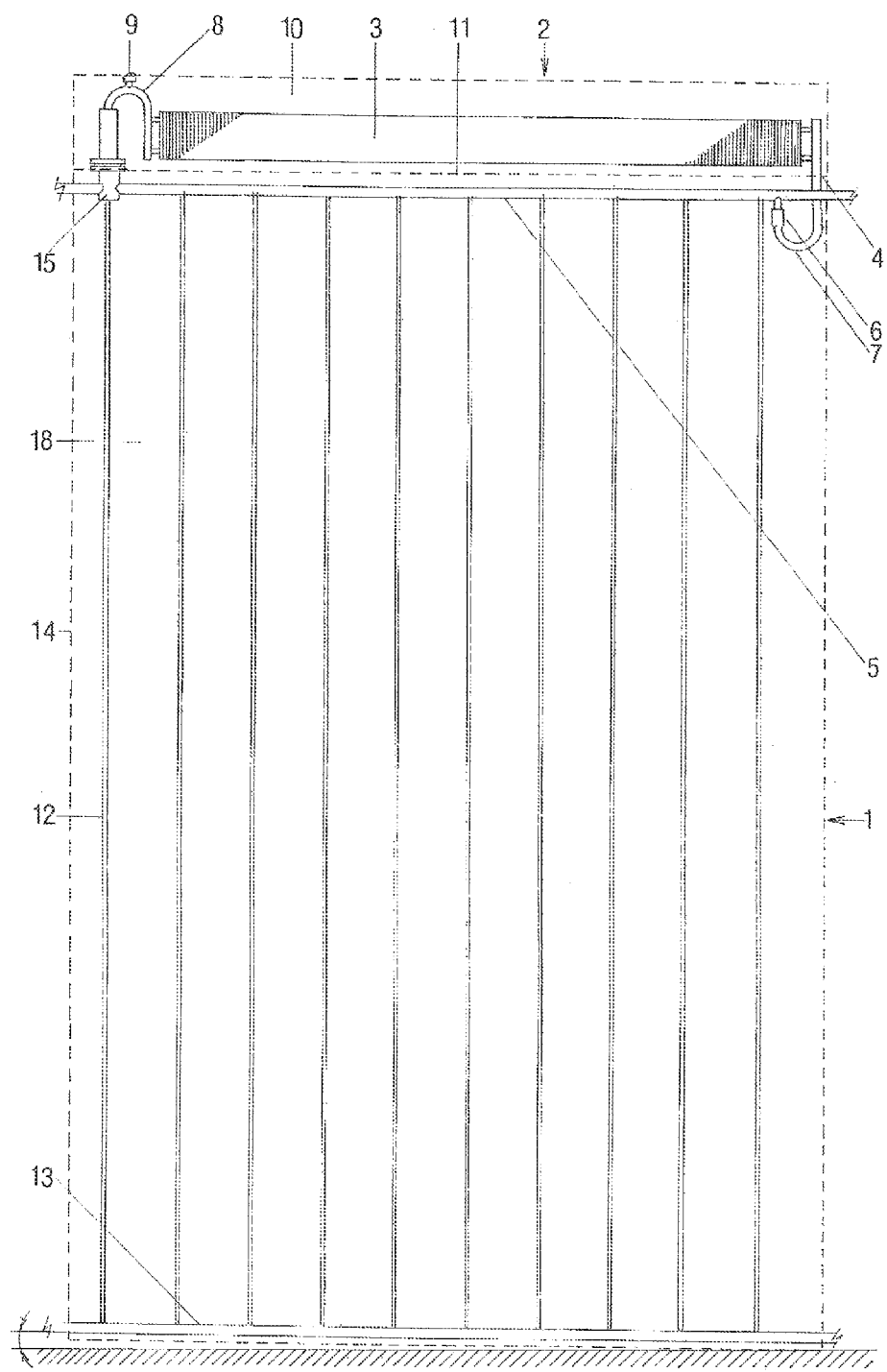
Figure 8:
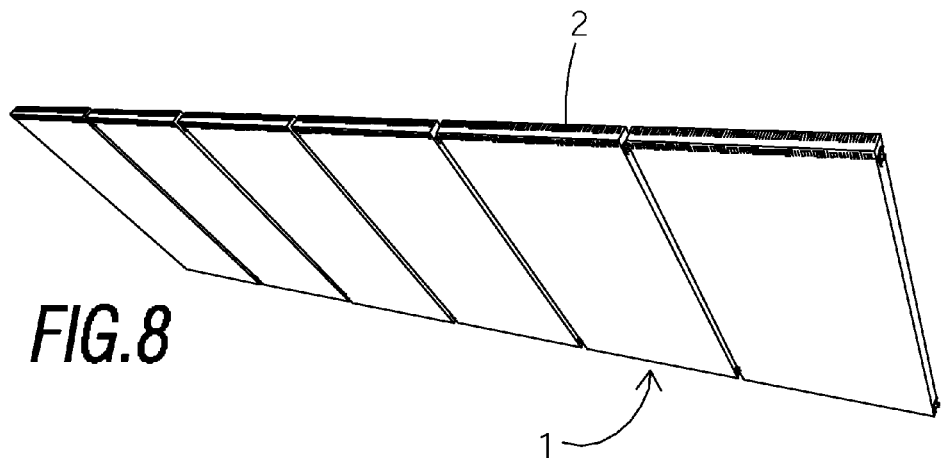
Figure 9:
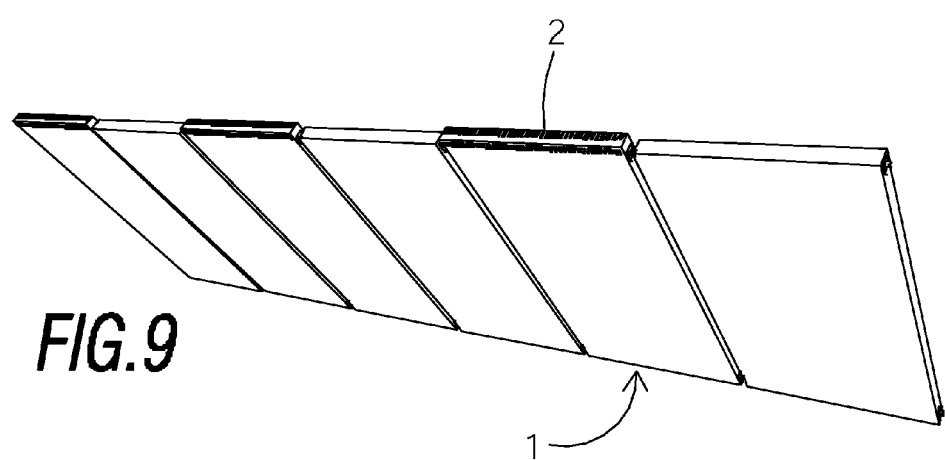
Figure 10:
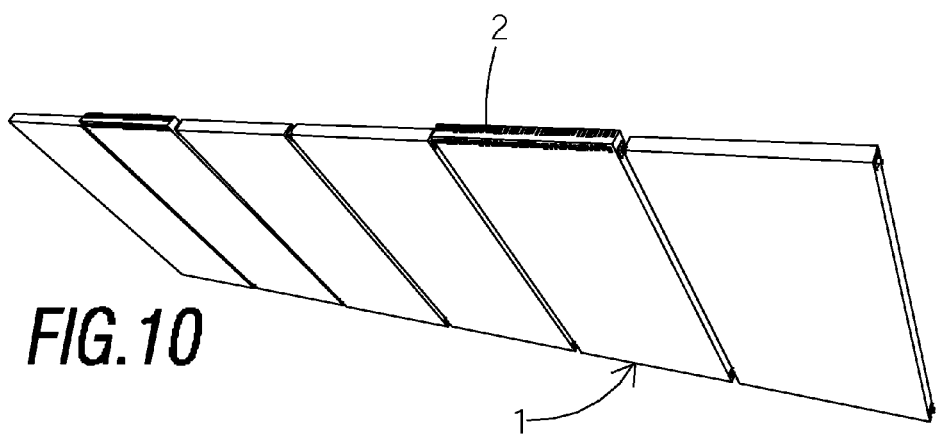

FIG. 1.—Is a front elevation view of a first embodiment of a solar thermal collector with the dissipating device according to the invention;

FIG. 2.—Is a partial front elevation view of a first embodiment of the solar thermal collector;

FIG. 3.—Is a perspective view from above of a solar thermal collector according to the invention;

FIG. 4.—Is an enlarged partial view, indicated by a circle in FIG. 3, of a part of the dissipating device of the solar thermal collector according to the invention;

FIG. 5.—Is a side elevation view of an embodiment of a solar thermal collector with the dissipating device according to the invention;

FIG. 6.—Is a rear elevation view of an embodiment of a solar thermal collector with the dissipating device according to the invention;

FIG. 7.—Is a front elevation view of a second embodiment of a solar thermal collector with the dissipating device according to the invention;

FIG. 8.—Is a rear elevation view of an assembly of several solar thermal collectors in a climatic region with strong solar radiation;

FIG. 9.—Is a rear elevation view of an assembly of several solar thermal collectors in a climatic region with normal solar radiation; and FIG. 10.—Is a rear elevation view of an assembly of several solar thermal collectors in a climatic region with weak solar radiation;

A DESCRIPTION OF A PREFERRED EMBODIMENT

The attached figures show two preferred embodiments of a solar thermal collector, designated in a general way with reference number 1, object of the present invention.

A preferred embodiment of a solar thermal collector 1 according to the invention can be seen in FIG. 1, wherein the frame 14 is shown by dotted lines, which comprises a plurality of parallel vertical tubes 12, connected to each other by at least one upper horizontal tube 5 and a lower horizontal tube 13 through which a heat carrying fluid flows, and a dissipating device 2 installed in an upper area of the solar thermal collector 1, intended to prevent overheating that is harmful to the solar thermal collector 1 components and the solar energy installation itself.

This dissipating device 2 basically comprises a thermostatic valve 15, a heat exchanger 3 and a return pipe 4. The thermostatic valve 15 is advantageously housed on upper horizontal tube 5, and the return pipe 4 is connected to the lower horizontal tube 13, and as an option a U-shaped tube (not shown) can be installed between the return pipe 4 and the lower horizontal tube 13, As shown in FIG. 1, the thermostatic valve 15 and the heat exchanger 3 are connected by means of a pipe 8 by way of an inverted U-shaped tube provided at greater height than the inlet of said heat exchanger 3.

The thermostatic valve 15 is preferably a 4-port valve and is thermally insulated at the top to prevent small heat losses under normal working conditions. One of these ports is connected to the upper end of one of the vertical tubes 12 of the solar thermal collector 1, another two ports are connected to the upper horizontal tube 5 and the last upper one to the heat exchanger 3 by means of pipe 8 by way of an inverted U-shaped tube.

Due to these technical characteristics once the heat carrying fluid reaches a temperature on the inside of the solar thermal collector 1 of 90° C., for example, a sensing element (not shown) of the thermostatic valve 15 detects this temperature reliably due to the fact that three of its four ports are connected to the upper horizontal tube 5 and to the upper end of one of the vertical tubes 12 of the solar thermal collector 1, which is where the highest temperatures in the whole of the solar thermal collector 1 are reached. In this way the thermostatic valve 15 opens the fourth upper port and enables the flow of the heat carrying fluid to the heat exchanger 3, crossing the pipe 8 by way of an inverted U-shaped tube that is provided at a greater height than the inlet to the heat exchanger 3.

After the heat carrying fluid has gone through the heat exchanger 3, which has reduced its temperature, it advantageously goes back to the lower horizontal tube 13. Once there it goes up the vertical tubes 12 of the absorber 18 until it reaches the upper horizontal tube 5, from where it continues to the thermostatic valve 15 and once again to the heat exchanger 3.

In this way an unstable balance for the system is established as the colder, and therefore denser, heat carrying fluid, is in the heat exchanger 3, and the hotter, and therefore less dense, heat carrying fluid, is on the inside of all the horizontal and vertical tubes that make up the absorber 18 of the solar panel 1.

This dissipating device 2 is preferably housed in a chamber 10, removable or not, separated from the rest of the solar thermal collector 1 by means of a dividing wall 11, said chamber 10 having air grilles 17 on two walls thereof, as seen in FIGS. 3, 4 and 6. In FIGS. 3 and 4 some elements have been omitted to make the understanding easier and dotted lines are used to represent part of the frame.

In order to be able to carry out a venting of the dissipating device 2, a manually operated air vent 9 has been provided at the highest point of said dissipating device 2.

In FIG. 7 a second embodiment of the invention is shown wherein the return pipe 4 is connected to the upper horizontal tube 5, where the same numerical references have been used to designate the common parts to the first embodiment.

In this second embodiment, unlike the first embodiment, after the passage through the heat exchanger 3, the heat carrying fluid whose temperature has been advantageously reduced, goes back to the upper horizontal tube 5. The return pipe 4 comprises a portion 6 provided lower than the upper horizontal tube 5 to which it is connected by way of a U-shaped tube and in addition an insulating sleeve 7, thus under normal working conditions, the heat transfer is interrupted between the upper horizontal tube 5 and the heat exchanger 3, respectively by convection and conduction.

In order to allow the heat carrying fluid to make the run through the thermostatic valve 15, the heat exchanger 3, the upper horizontal tube 5, the rest of the absorber 18 and once again the thermostatic valve 15, it is necessary to provide the solar thermal collector 1 with a lateral inclination in relation to the horizontal plane, in the direction of the thermostatic valve 15, preferably of at least one degree.

FIG. 5 shows a lateral elevation view of the solar thermal collector 1 wherein the optimum visual integration of the dissipating device 2 in the solar thermal collector 1 assembly can be seen.

Additionally due to providing the heat exchanger 3 on the inside of chamber 10, the thin aluminium vanes of said heat exchanger 3 obtain a protection against bad weather conditions like hailstone, snow, etc. Another advantage of said chamber 10 lies on the fact that installers and users are protected from burns and injuries.

In FIG. 2 a portion 16 of the glass surface of the solar thermal collector that can be seen is advantageously opaque, coinciding with the position of the thermostatic valve 15, thus preventing the heating of said thermostatic valve 15, by the action of solar rays, whilst the assembly is being carried out. Said opaque portion 16 consists of, for example, an adhesive, a chemical treatment to the surface of the glass or any other similar system. Due to this characteristic the assembly is made easier, on allowing the handling of the thermostatic valve 15 by the installer in complete safety as there is no risk of burns.

It can be appreciated that as a result of the singular arrangement of the solar thermal collector 1 according to the invention, the transport, handling, installation and maintenance is made easier with the consequent financial advantages. In addition, the installer will be able to opt, depending on the needs, between installing a single solar thermal collector 1 or to connect several units to each other to form a battery in a known way. If this assembly option is chosen, depending on the climatic region (strong or weak solar radiation) and the power of the dissipating device 2 itself, solar thermal collectors 1 according to the invention can be combined with solar thermal collectors without the dissipating device 2. If the solar power installation is located in a climatic region with weak solar radiation, the solar thermal collectors 1 according to the invention will be able to control the heat dissipation of the solar thermal collector 1 itself and that of other solar thermal collectors without the heat dissipating device 2. In this way the solar power installation can be simplified, consequently achieving advantages from the financial point of view.

Groups of solar thermal collectors 1 are shown in FIGS. 8, 9 and 10, respectively for climatic regions with strong, normal and weak solar radiation.

The details, shapes, sizes and other accessorial elements, likewise the materials used in the manufacture of the solar thermal collector of the invention can be appropriately substituted by others that are technically equivalent and do not depart from the essence of the invention or the scope defined by the claims that are included below.

The invention claimed is:

1. A solar thermal collector comprising:
   a plurality of parallel vertical tubes, connected to each other by at least one upper horizontal tube and by one lower horizontal tube through which a heat carrying fluid flows,
   a glass surface that covers the parallel vertical tubes, the upper horizontal tube and the lower horizontal tube, and a dissipating device installed in an upper part of the solar thermal collector, said dissipating device including a thermostatic valve, a heat exchanger and a return pipe, wherein said thermostatic valve is housed in the upper horizontal tube, the thermostatic valve and the heat exchanger being connected by means of a pipe by way of an inverted U-shaped tube provided at a greater height than an inlet of said heat exchanger, such that, under normal working conditions for a solar power installation, energy losses due to the heat transfer by convection from the thermostatic valve to the heat exchanger are prevented.

2. A solar thermal collector according to claim 1, wherein said return pipe is connected to said lower horizontal tube.

3. A solar thermal collector according to claim 1, wherein said return pipe is connected to said upper horizontal tube by way of a U-shaped tub and and the return pipe comprises a portion provided at a lower height than the upper horizontal tube, in such a way that the U-shaped tube acts as a hydraulic lock for any heat transfer by convection, under normal working conditions for the solar power installation, the solar thermal collector being provided with a lateral inclination in relation to a horizontal plane.

4. A solar thermal collector according to claim 3 wherein the return pipe comprises an insulating sleeve in such a way that it interrupts the heat transfer by conduction between the heat exchanger and the upper horizontal tube.

5. A solar thermal collector according to claim 3 wherein said lateral inclination is at least 1 degree.

6. A solar thermal collector according to claim 1, wherein the thermostatic valve is of the four-port type.

7. A solar thermal collector according to claim 1, wherein said thermostatic valve is thermally insulated at least partially.

8. A solar thermal collector according to claim 1, wherein said thermostatic valve allows the passage of the heat carrying fluid to the heat exchanger when the heat carrying fluid reaches a pre-set temperature.

9. A solar thermal collector according to claim 1, wherein a manually operated air vent is provided at a highest point of the inverted U-shaped tube.

10. A solar thermal collector according to claim 1, wherein said dissipating device is housed in a chamber that is separated from the rest of the solar panel by means of a dividing wall.

11. A solar thermal collector according to claim 10, wherein said chamber has air grilles on at least two walls thereof.

* * * * *